US011687802B2

(12) United States Patent
Subramanya et al.

(10) Patent No.: US 11,687,802 B2
(45) Date of Patent: Jun. 27, 2023

(54) SYSTEMS AND METHODS FOR PROACTIVELY PREDICTING USER INTENTS IN PERSONAL AGENTS

(71) Applicant: Walmart Apollo, LLC, Bentonville, AR (US)

(72) Inventors: Shankara Bhargava Subramanya, Santa Clara, CA (US); Komal Arvind Dhuri, San Jose, CA (US); Deepa Mohan, San Jose, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 560 days.

(21) Appl. No.: 16/682,070

(22) Filed: Nov. 13, 2019

(65) Prior Publication Data

US 2021/0142189 A1    May 13, 2021

(51) Int. Cl.
| | | |
|---|---|---|
| *G06N 5/04* | (2023.01) | |
| *G06N 20/00* | (2019.01) | |
| *G06N 3/006* | (2023.01) | |
| *G10L 15/18* | (2013.01) | |
| *G10L 15/30* | (2013.01) | |
| *G10L 15/22* | (2006.01) | |
| *G06F 40/30* | (2020.01) | |
| *G06F 3/16* | (2006.01) | |
| *H04L 67/50* | (2022.01) | |

(52) U.S. Cl.
CPC .............. *G06N 5/04* (2013.01); *G06F 3/167* (2013.01); *G06F 40/30* (2020.01); *G06N 3/006* (2013.01); *G06N 20/00* (2019.01); *G10L 15/1815* (2013.01); *G10L 15/1822* (2013.01); *G10L 15/22* (2013.01); *G10L 15/30* (2013.01); *H04L 67/535* (2022.05); *G10L 2015/223* (2013.01)

(58) Field of Classification Search
CPC . G06F 40/30; G10L 15/1815; G10L 15/1822; G10L 15/22; G10L 15/30
USPC ...................................................... 704/1–504
See application file for complete search history.

(56) References Cited

U.S. PATENT DOCUMENTS

| | | | |
|---|---|---|---|
| 6,993,586 B2 | 1/2006 | Chen et al. | |
| 8,656,280 B2 * | 2/2014 | Morikawa ............ | H04N 21/432 715/708 |
| 8,849,730 B2 | 9/2014 | Winn et al. | |
| 9,245,225 B2 | 1/2016 | Winn et al. | |

(Continued)

OTHER PUBLICATIONS

Qu et al., "User Intent Prediction in Information-Seeking Conversations", Association for Computing Machinery, 2019.

(Continued)

*Primary Examiner* — Marcus T Riley
(74) *Attorney, Agent, or Firm* — Morgan, Lewis & Bockius LLP; Manita Rawat (57) ABSTRACT

This application relates to systems and methods for proactively predicting user intents on personal agents. In some examples, a user intent prediction system can include a computing device configured to obtain user intent data identifying a desired action by a user on a network-enabled tool. The computing device is further configured to obtain contextual data characterizing a user's interaction with the network-enabled tool. The computing device can then determine at least one predicted future intent of the user on the network-enabled tool based on the user intent data and the contextual data and present the at least one predicted future intent to the user.

20 Claims, 8 Drawing Sheets

(56) References Cited

U.S. PATENT DOCUMENTS

| | | | |
|---|---|---|---|
| 10,108,934 | B2 | 10/2018 | Basu et al. |
| 10,394,954 | B2* | 8/2019 | Vainas .................... G06F 40/30 |
| 10,474,954 | B2 | 11/2019 | Kumar et al. |
| 10,607,598 | B1* | 3/2020 | Larson .................... G10L 15/07 |
| 10,714,084 | B2* | 7/2020 | Engles ................ G10L 15/1815 |
| 10,984,782 | B2* | 4/2021 | Finkelstein ............. G10L 15/24 |
| 11,321,362 | B2* | 5/2022 | Iwata .................... G06F 16/288 |
| 2013/0159408 | A1 | 6/2013 | Winn et al. |
| 2018/0157638 | A1* | 6/2018 | Li ............................ G10L 15/22 |
| 2018/0157958 | A1* | 6/2018 | Fourney ................ G06F 3/0237 |
| 2020/0097981 | A1 | 3/2020 | Teo et al. |
| 2021/0125025 | A1* | 4/2021 | Kuo .................... H04L 65/1069 |
| 2021/0142189 | A1* | 5/2021 | Subramanya ......... H04L 67/535 |
| 2022/0155926 | A1* | 5/2022 | Bhatt ...................... G06F 3/167 |

OTHER PUBLICATIONS

Sun et al., "Collaborative Intent Prediction with Real-Time Contextual Data", ACM Transactions on Information Systems, 2017.
Luukkonen et al., "LSTM-Based Predictions for Proactive Information Retrieval", 2016.
Zhang et al., "Collaborative Filtering for Recommender Systems", IEEE, 2014.
Devlin et al. "BERT: Pre-Training of Deep Bidirectional Transformers for Language Understanding", 2018.
Pascual, "Everything You Should Know about Customer Service Automation" Aug. 28, 2019, retrieved Jan. 6, 2022 <https://monkeylearn.com/blog/customer-service-automation/#dos-and-donts>.
Poi, et al., "Predict customer contact intent using AI and Amazon Connect" AWS Contact Center, Dec. 10, 2020, etrieved Jan. 6, 2022 <https://aws.amazon.com/blogs/contact-center/predict-customer-contact-intent-using-ai-and-amazon-connect/>.

* cited by examiner

SYSTEMS AND METHODS FOR PROACTIVELY PREDICTING USER INTENTS IN PERSONAL AGENTS

TECHNICAL FIELD

The disclosure relates generally to computerized personal agents and, more specifically, to systems and methods for proactively predicting user intents in computerized personal agents.

BACKGROUND

User interactions with computing devices can include interactions through personal agents. Such personal agents can be aspects of a website, an application, a software tool, a mobile phone, smart phone, tablet, laptop, operating system, smart speaker or other computing device. Some well known personal agents reside as part of a smart speaker or mobile application and enable a user to interact with and cause actions to be executed by using voice commands rather than key stroke or other tactile input mechanisms. Such personal agents with conversational voice commands often include systems and methods to convert voice commands of the user into actions on the computing device.

While users are becoming more accustomed to the use of personal agents and the personal agents are increasingly able to accurately recognize a voice command of a user, the use of personal agents by some users can be a frustrating or unsatisfactory experience. There is an opportunity, therefore, to improve a user's experience with the personal agent. For example, the personal agent may require more information than a user originally provides to complete an action requested by the user. In such instances, the personal agent may request additional information. This repeated interaction between a user and a personal agent can add time to what a user may believe is a satisfactory amount of time to complete an action. In another example, a user may not know the right word to speak to the personal agent in order to complete an action. In these instances, the repeated attempt by a user to complete an action by using different voice commands can lead to frustration or an unsatisfactory experience. In such examples and in other interactions with a personal agent, there are opportunities to improve a user's interaction with the personal agent.

SUMMARY

The embodiments described herein are directed to automatically determining and presenting predicted user intents on a network-enabled tool. The embodiments may determine a predicted future action or other user intent that may be an action that is likely to follow a current action. In one example, the embodiments may be implemented in a personal agent that interacts with a retailer's website. The embodiments may allow predicted future actions of the user on the website to be presented or otherwise communicated to the user through the personal agent. For example, the embodiments described further herein may allow the personal agent to communicate to the user a choice of follow-up or predicted future actions that the user is likely to take so that the user can choose one of the predicted future actions rather than having to figure out on his or her own, a correct command to execute such action. This type of activity by the personal agent or other network-enabled tool can decrease the amount of time that it takes to execute an activity on the website using the personal agent. Further, the embodiments may cause the user to purchase more items using the personal agent because the interaction is simplified and less time-consuming. Still further, the user may be more likely to re-visit or re-use the personal agent because the user's experience was pleasant and less time-consuming. As a result, the embodiments of the present disclosure can increase sales and increase user satisfaction by implementing the determination and presentation of the predicted user intents to the user. In addition to or instead of these example advantages, persons of ordinary skill in the art would recognize and appreciate other advantages as well.

In accordance with various embodiments, exemplary systems may be implemented in any suitable hardware or hardware and software, such as in any suitable computing device. For example, in some embodiments, a computing device is configured to obtain user intent data identifying a desired action by a user on a network-enabled tool. The computing device can also obtain contextual data characterizing a user's interaction with the network-enabled tool and determine at least one predicted future intent of the user on the network-enabled tool based on the user intent data and the contextual data. The computing device may then cause the at least one predicted future intent to be presented to the user. The user intent data may include, in some embodiments, user current query data and user conversation data from the user's current session.

In some embodiments, a method is provided that includes obtaining user intent data identifying a desired action by a user on a network-enabled tool. The method may also include obtaining contextual data characterizing a user's interaction with the network-enabled tool and determining at least one predicted future intent of the user on the network-enabled tool based on the user intent data and the contextual data. The method may also include presenting the at least one predicted future intent to the user.

In yet other embodiments, a non-transitory computer readable medium has instructions stored thereon, where the instructions, when executed by at least one processor, cause a computing device to perform operations that include obtaining user intent data identifying a desired action by a user on a network-enabled tool and obtaining contextual data characterizing a user's interaction with the network-enabled tool. The instructions, when executed by the at least one processor further cause the computing device to perform operations that include determining at least one predicted future intent of the user on the network-enabled tool based on the user intent data and the contextual data and presenting the at least one predicted future intent to the user. The user intent data may include, in some embodiments, user current query data and user conversation data from the user's current session.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Figure 1:
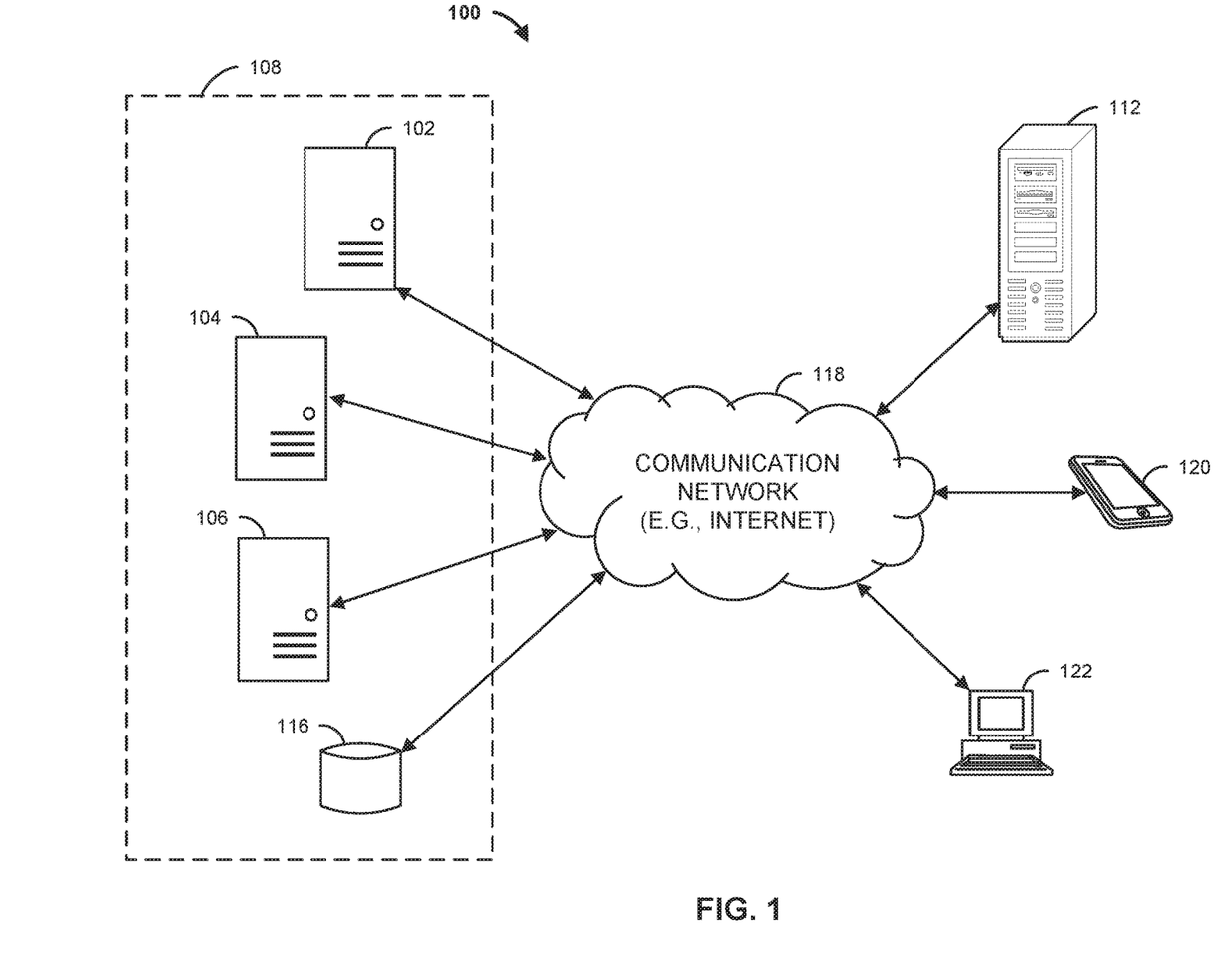
FIG. 1 is a block diagram of a user intent prediction system in accordance with some embodiments.

Turning to the drawings, FIG. 1 illustrates a block diagram of a user communication system 100 that may include a user intent prediction system 108, a user computing device 112, a mobile user computing device 120, a user desktop computing device 122 and a network 118. The user intent prediction system 108 may include a user intent computing device 102 (e.g., a server, such as an application server), a natural language processing device 104 (e.g., a server, such as an application server), a content delivery computing device 106 (e.g., a web server) and a database 116. Each of the foregoing can be operatively coupled to each other over the network 118.

For example, user intent computing device 102 can be a computer, a workstation, a laptop, a server such as a cloud-based server, or any other suitable device. Similarly, the natural language processing device 104 and the content delivery computing device 106 can each be a computer, a workstation, a laptop, a server such as a cloud-based server, or any other suitable device. In one example, the user intent computing device 102, the natural language processing device 104 and the content delivery computing device 106 are each an individual server. In other examples, these devices can be included on a common server or servers.

Each of multiple user computing devices 112, 120, 122 can be a personal computing device such as a cellular phone, a laptop, a computer, a smartphone, a smart speaker, a tablet, a personal assistant device, a voice assistant device, a digital assistant, or any other suitable device.

Additionally, each of the user intent computing device 102, natural language processing device 104, content delivery computing device 106, and multiple user computing devices 112, 120, 122 can include one or more processors, one or more field-programmable gate arrays (FPGAs), one or more application-specific integrated circuits (ASICs), one or more state machines, digital circuitry, or any other suitable circuitry.

Although FIG. 1 illustrates three user computing devices 112, 120, 122, user communication system 100 can include any number of user computing devices 112, 120, 122. Similarly, user intent prediction system 108 can include any number of devices 102, 104, 106 or any number of databases 116.

The user intent computing device 102, natural language processing device 104 and content delivery computing device 106 are operable to communicate with each other and with database 116 over communication network 118. For example, user intent computing device 102 can store data to, and read data from, database 116. Database 116 can be a remote storage device, such as a cloud-based server, a memory device on another application server, a networked computer, or any other suitable remote storage. Although shown remote to user intent computing device 102, in some examples, database 116 can be a local storage device, such as a hard drive, a non-volatile memory, or a USB stick. As can be appreciated, one or more of the devices of the user communication system 100 can be combined and/or operatively coupled together instead of or in addition to being operatively coupled together by network 118.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Figure 2:
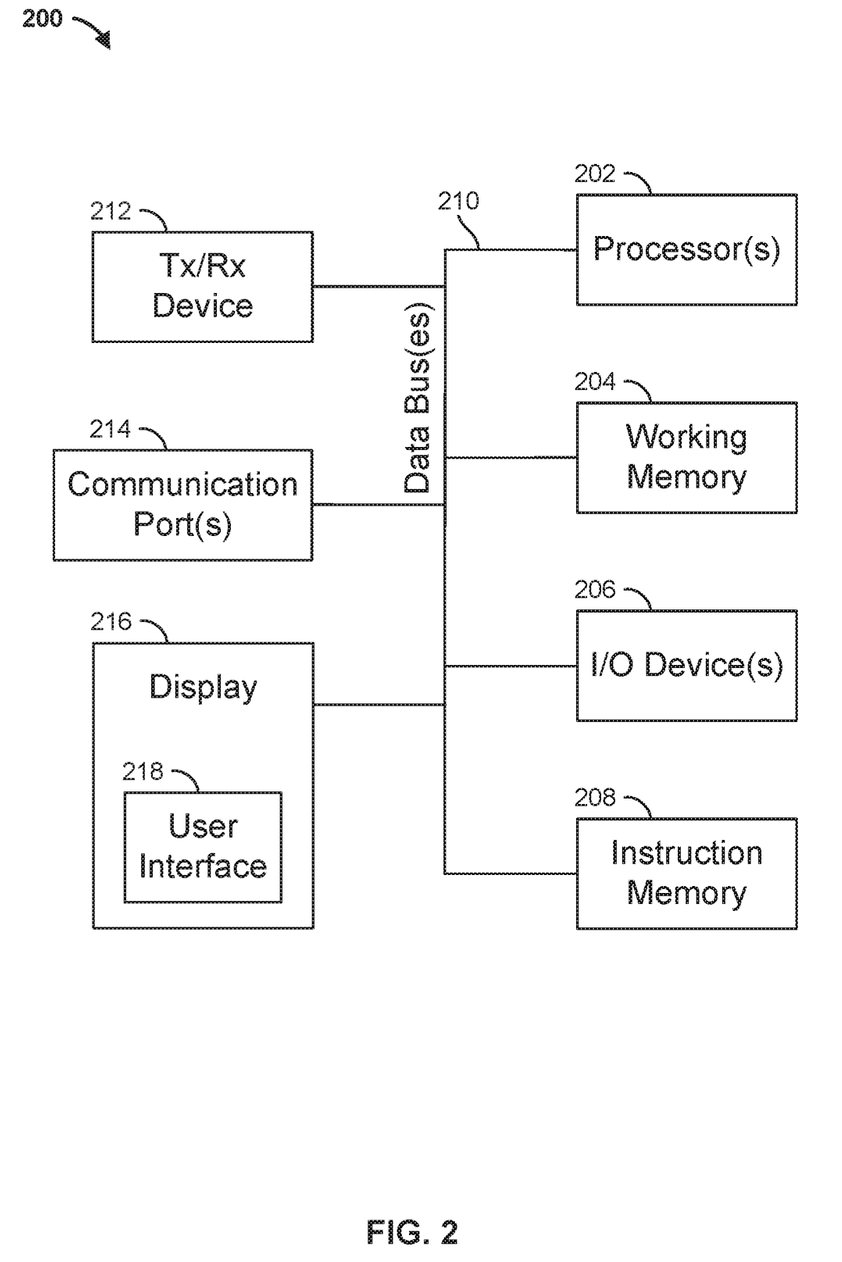
FIG. 2 is a block diagram of a user intent computing device of the user intent prediction system of FIG. 1 in accordance with some embodiments.

FIG. 2 illustrates an example computing device 200. The user intent computing device 102, the natural language processing device 104, the content delivery computing device 106, the user computing device 112, the mobile user computing device 120 and/or the user desktop computing device 122 may include the features shown in FIG. 2. For the sake of brevity, FIG. 2 is described relative to the user intent computing device 102. It should be appreciated, however, that the elements described can be included, as applicable, in the natural language processing device 104, the content delivery computing device 106, the user computing device 112, the mobile user computing device 120 and the user desktop computing device 122

As shown, the user intent computing device 102 can be a computing device 200 that may include one or more processors 202, working memory 204, one or more input/output devices 206, instruction memory 208, a transceiver 212, one or more communication ports 214, and a display 216, all operatively coupled to one or more data buses 210. Data buses 210 allow for communication among the various devices. Data buses 210 can include wired, or wireless, communication channels.

Processors 202 can include one or more distinct processors, each having one or more cores. Each of the distinct processors can have the same or different structure. Processors 202 can include one or more central processing units (CPUs), one or more graphics processing units (GPUs), application specific integrated circuits (ASICs), digital signal processors (DSPs), and the like.

Processors 202 can be configured to perform a certain function or operation by executing code, stored on instruction memory 208, embodying the function or operation. For example, processors 202 can be configured to perform one or more of any function, method, or operation disclosed herein.

Instruction memory 208 can store instructions that can be accessed (e.g., read) and executed by processors 202. For example, instruction memory 208 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 202 can store data to, and read data from, working memory 204. For example, processors 202 can store a working set of instructions to working memory 204, such as instructions loaded from instruction memory 208. Processors 202 can also use working memory 204 to store dynamic data created during the operation of user intent prediction device 102. Working memory 204 can be a random access memory (RAM) such as a static random access memory (SRAM) or dynamic random access memory (DRAM), or any other suitable memory.

Input-output devices 206 can include any suitable device that allows for data input or output. For example, input-output devices 206 can include one or more of a keyboard, a touchpad, a mouse, a stylus, a touchscreen, a physical button, a speaker, a microphone, or any other suitable input or output device.

Communication port(s) 214 can include, for example, a serial port such as a universal asynchronous receiver/transmitter (UART) connection, a Universal Serial Bus (USB) connection, or any other suitable communication port or connection. In some examples, communication port(s) 214 allows for the programming of executable instructions in instruction memory 208. In some examples, communication port(s) 214 allow for the transfer (e.g., uploading or downloading) of data, such as user identification data and/or user device data.

Display 216 can display a user interface 218. User interfaces 218 can enable user interaction with the user intent computing device 102. For example, user interface 218 can be a user interface that allows an operator to interact, communicate, control and/or modify different messages or features that may be presented or otherwise displayed to a user by a network-enabled tool such as a personal agent. The user interface 218 can include a slider bar, dialogue box, or other input field that allows the user to control, communicate or modify an action performed on a network-enabled tool such as a personal agent. In addition, the user interface 218 can include one or more input fields or controls that allow a user to modify or control optional features or customizable aspects of a network-enabled tool such as a personal agent. In some examples, a user can interact with user interface 218 by engaging input-output devices 206. In some examples, display 216 can be a touchscreen, where user interface 218 is displayed on the touchscreen.

Transceiver 212 allows for communication with a network, such as the communication network 118 of FIG. 1. For example, if communication network 118 of FIG. 1 is a cellular network, transceiver 212 is configured to allow communications with the cellular network. In some examples, transceiver 212 is selected based on the type of communication network 118 user intent computing device 102 will be operating in. Processor(s) 202 is operable to receive data from, or send data to, a network, such as communication network 118 of FIG. 1, via transceiver 212.

Figure 3:
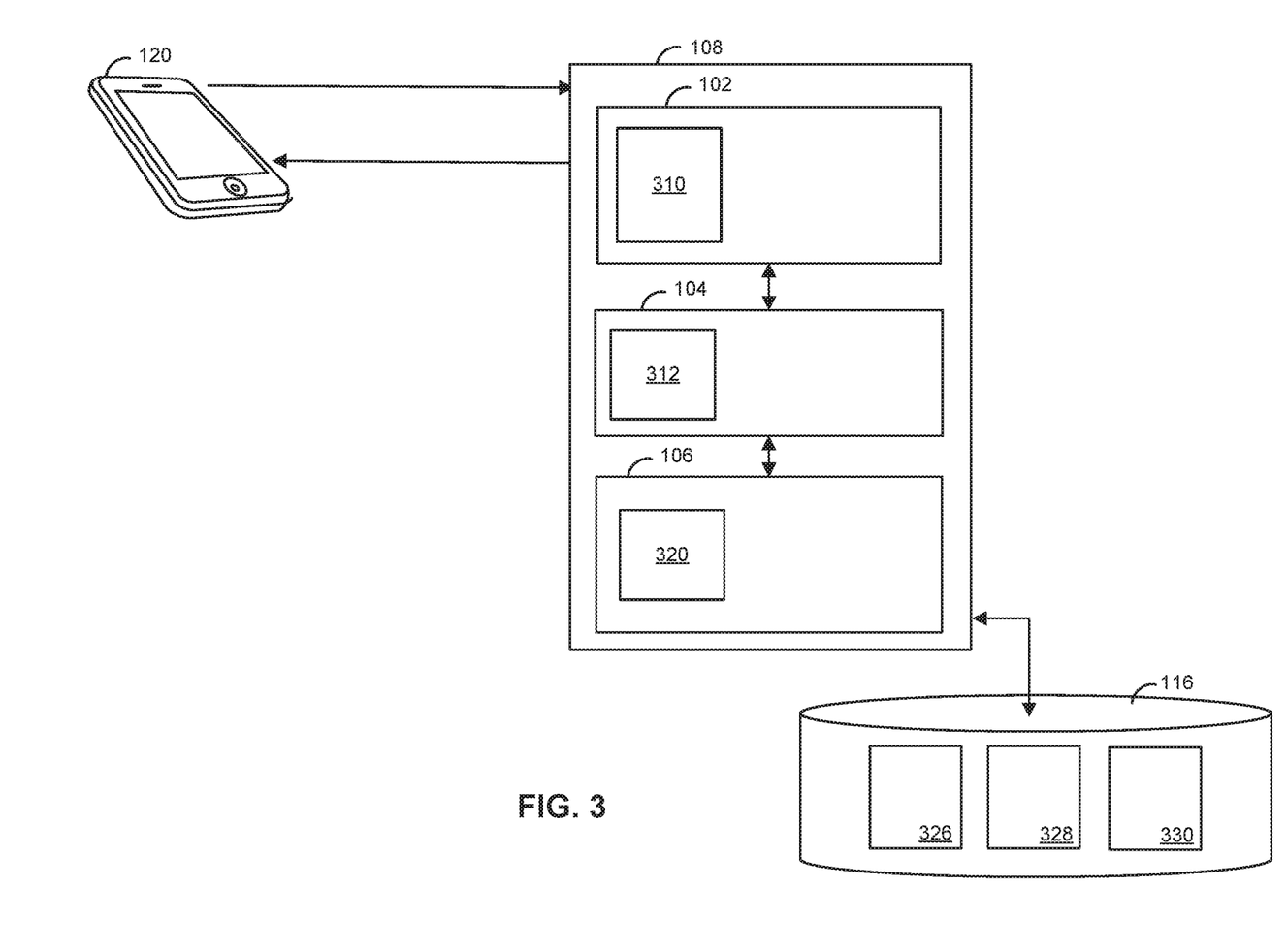
FIG. 3 is a block diagram illustrating an example user intent prediction system in accordance with some embodiments.

Turning now to FIG. 3, an example user intent prediction system 108 can include the user intent computing device 102, the natural language processing device 104, the content delivery computing device 106. The user intent prediction system 108 can be operatively coupled to the database and the user computing device 120. As also shown, the user intent computing device 102, the natural language processing device 104 and the content delivery computing device 106 can be operatively coupled to each other as well. The user intent computing device 102, the natural language processing device 104 and the content delivery computing device 106 can be operatively coupled to each other via any communication link or suitable connection, including wired or wireless connections, such as for example, the network 118 (FIG. 1).

The user intent prediction system 108 can be used in connection with various network-enabled tools. A network-enabled tool, for purposes of the present disclosure, can be any suitable computing device, application, customer service tool, or the like that includes a personal agent. Example network-enabled tools include, without limitation, workstations, laptops, telephones, mobile telephones, smartphones, smart speakers, smart screens, tablets, servers, operating systems, customer service systems, voicemail systems, email systems, digital messaging systems and other computing devices.

Personal agents, for purposes of the present disclosure, are any suitable electronic or digital agents such as an electronic personal assistant or voice agent that may be provided in connection with the network-enabled tool that assist a user or customer in interacting with or executing actions on the network-enabled tool. The personal agents can often assist a user in performing actions on the network-enabled tool by allowing the user to speak to the personal agent. The personal agents can include language processing engines that can convert a user's speech into actionable commands. The personal agents can also present actionable commands to the user using a display or audible speech options. The personal agent can also present other information to the user using visible, tactile, or audible messages.

For example, a retailer's website can include a personal agent to assist a user in searching for and buying items. The personal agent can, using the spoken commands of the user, search for particular items of interest, adds items to the user's digital cart, set-up a pick-up or delivery location, purchase items, cancel an order, modify an order, return items or any other suitable activity that may be taken on the retailer's website. Such commands and activity on the retailer's website, however, can often take longer than a user typically wants to spend interacting with the personal agent. In addition, a user can become frustrated because the personal agent does not understand what the user is trying to accomplish via his or her vocal commands. These types of actions by a user can lead to dissatisfaction with the personal agent and/or with the retailer's website. The dissatisfaction can lead to lost or decreased sales on the retailer's website or may lead to reduced site visits by users. The systems and methods of the present disclosure improve users' satisfaction and can lead to increased sales and increased site visits because, as will be further described, a user's intent is predicted using user intent data and contextual data. The predicted intent(s) of the user can be presented to the user to speed up and proactively improve the accuracy of the personal agent.

In the example above, the application of the systems and methods of the present disclosure are described in the context of retailer's website. The systems and methods of the present disclosure, however, can be applied to any suitable network-enabled tool that may include a digital agent. Such alternate example applications of the systems and methods of the present disclosure include operating systems, gaming systems, customer service systems, voicemail systems, electronic messaging systems, ordering systems and the like. For the sake of brevity, the systems and methods of the present disclosure are described relative to a retailer's website and/or a retailer's online store. Such description should not be interpreted as limiting the application of the systems and methods of the present disclosure from other network-enabled tools that may use personal agents.

Referring back to FIG. 3, the user intent computing device 102 can include a user intent engine 310. The user intent engine 310 can be any suitable model, application, or other tool that can use user intent data and contextual data to predict a user's future intent. In one example, the user intent engine 310 is a predictive user intent data model built on top of contextual embeddings created using the Bidirectional Encoder Representations from Transformers (BERT) model. In other examples, other models using artificial intelligence, machine learning and/or neural networks can also be used. Other example models that can be used include ULMFiT, Transformer, Transformer-XL, GPT-2, ELMo, Flair, StandfordNLP and the like.

The predictive user intent data model can be trained using a train data set that is arranged based on previous user queries in multi-turn conversations using a personal agent. The train data can include a series of data that includes a Sentence A that is a past user statement, a Sentence B that is a current user query and a Label that is a prediction of the possible future intents that a user might take at the next step. Such train data can be arranged as shown below.

| Sentence A | Sentence B | Labels |
| --- | --- | --- |
| Talk to Walmart | Add frozen pretzels | New Search, Checkout, Cart Help, New Cart |

In addition to the train data including the data arranged as shown above, the train data includes contextual data. The contextual data can include data regarding the interaction, status, preferences and settings of the user with the personal agent and/or user intent prediction system 108. For example, the contextual data can include information regarding a user's cart, pending orders, pickup store, pickup slot, address, user sentiment during the conversation and the like. The contextual data can be assembled for each "row" of train data as shown above.

In one example, the train data is assembled from actual user data that is collected during sessions between the user and the personal agent. Since large amounts of data are required to effectively train the predictive user intent data model. Such large amounts of actual user data may not be available. In such instances when actual data is not available, synthetic train data can be used to train the predictive user intent data model. The synthetic train data can be assembled by technicians or programmers from simulations or can be derived from actual data that may be available. The synthetic train data can be derived by trying to model how actual data may look like (i.e., by predicting or otherwise deriving actual behavior of users).

Once the predictive user intent data model is placed into active service, the user intent prediction system can collect user intent data and contextual data. The user intent data and the contextual data can be stored in the database 116. This stored data can be used, in some examples, to re-train or update the predictive user intent data model. The re-trained predictive user intent data model can be then placed into active service to replace the existing predictive user intent data model. In other examples, the user intent data and the contextual data can be stored in the database 116 and accessed by the user intent computing device 102. The user intent prediction system 108 can continuously update the predictive user intent data model using the user intent data and the contextual data that is collected during use of the system. As such, the model's reliance on the synthetic data can be reduced and the accuracy of the predictive user intent data model can improve. As will be described in further detail below, the user intent prediction system 108 can also continuously monitor and archive the predictive user intent data model to ensure that the most accurate version of the predictive user intent data model is being used.

Personal agents can use a process called "slot filling" to allow the personal agent to execute a command desired by a user. For example, the user may say "put bread in my cart." In response, the personal agent may not be able to execute the command with this limited information. Thus, the personal agent may say in response, "what type of bread do you want to add to your cart?" or "do you want me to search for available types of bread?" The user then responds and answers the personal agent. This repeated question and answer between the user and the personal agent is "slot-filling." The personal agent continues to ask questions until the personal agent has enough information to execute a task on the retailer website or online store. These types of multi-turn conversation (or "slot-filling") between the user and the personal agent can increase the amount of conversation and the amount of time that it takes to execute a command.

The systems and methods of the present disclosure reduce the amount of "turns" in such a multi-turn conversation between the user and the personal agent to improve the user's experience with the personal agent and the retailer's website or online store. The systems and methods of the present disclosure may also alert or otherwise communicate to the user various commands or actions that a user can execute that may not otherwise be known to the user. This can also improve the user's satisfaction and lead to improved satisfaction and increased sales.

Referring back to FIG. 3, the natural language processing device 104 can be any suitable system, application, model or other tool that can enable the natural language processing device 104 to interpret a user's speech into actionable commands. The natural language processing device can also include a speech model 312. The speech model 312 can be any suitable data model built with a neural network or other suitable machine learning to convert a user's speech into actionable commands. The models described above with regards to the user intent engine 310 can also be used in the speech model 312.

As further shown, user intent prediction system 108 can also include the content delivery computing device 106. The content delivery computing device 106 can be any suitable package that can be used to deliver the content for the retailer's website or online store. For example, the content delivery computing device 106 can include content 320 such as picture, item data, videos, and the like can be used to deliver the content of the retailer's website or online store to the mobile user computing device 120 or other user device.

Figure 4:
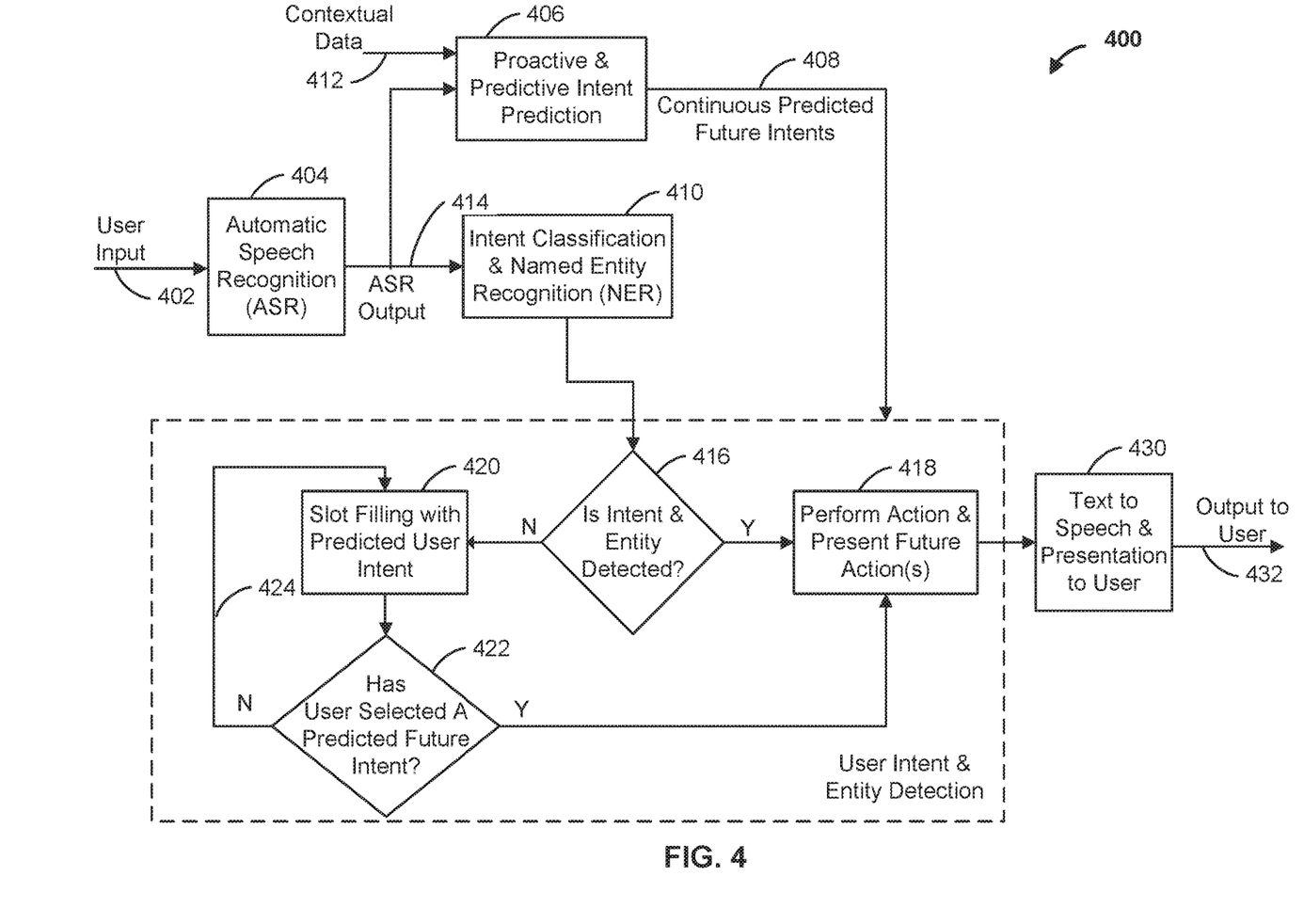
FIG. 4 is an example process flow illustrating a process of determining predicted future intents using the user intent prediction system of FIG. 3 in accordance with some embodiments.

Turning now to FIG. 4, an example process flow 400 is shown. The process flow 400 illustrates how the user intent prediction system 108 can interact with the user to improve the customer's satisfaction with an exemplary retailer website or online store. The process 400 can begin when a user's input 402 is received by the user intent prediction system 108. Such user input can be received from a mobile user computing 120 via an input signal (FIG. 3). Example user inputs 402 can include a user typing in a url or making an invocation command to the personal agent. For example, the invocation command for an example retailer may include touching the microphone button on a mobile application or saying an invocation command such as, "Hey Walmart." In other examples, other invocation commands can be used.

The user may provide further input to the personal agent. For example, the user may say, "add apples to my cart." This type of vocal command can be recognized by the user intent prediction system 108 at the step of Automatic Speech Recognition (ASR) 404. The speech model 312 of the natural language processing device 104, for example, can recognize the speech of the user. The ASR Output 414 can then be received by the user intent prediction system 108. The user intent prediction system 108 can classify the intent and recognize the entity of ASR Output 414 at Intent Classification & Named Entity Recognition 410. In general, an "intent" is a desired action of a user and an "entity" is an item or other object that the user desires to include as part of the action. For example, in the example described above in which a user speaks the command, "add apples to my cart." The "intent" is to add an item to the cart and the "entity" is the "apples." As can be appreciated, in order to execute this command, the personal agent needs to recognize the both the intent (e.g., "add") and the entity (e.g., "apples") in order to accurately execute the command.

At 410, the natural language processing device 104 can classify the intent by recognizing the word "add" as a word that means that the user wants to place an additional item into their cart. As can be appreciated, the natural language processing device 104 can classify intents into categories that mean the same action. For example, the words "add," "put," "buy," and "purchase" can all be classified as having the same action, i.e., placing an item into the user's cart for purchase. The natural language processing device 104 can also recognize the entity. For example, the speech model 312 can recognize the item that a user wants to purchase. For such recognition to occur the speech model 312 can be trained and/or includes with a list, database or other reference table to allow the entity to be recognized as an "apple," "bread," "milk," "ice cream" or any other item that may be spoken by a user when interacting with the personal agent.

After such classification and recognition occurs at 410, the user intent prediction system 108 determines whether the intent and entity has been detected at 416. If the user intent prediction system 108 has detected the intent and entity, the process 400 moves to step 418 where the user intent prediction system 108 can perform the action and present future actions to the user. At step 430, the natural language processing device 104 can convert text to speech and the content delivery computing device 106 can present information and/or data to the user as the output to user 432. For example, if the user intent prediction system 108 detects the intent "add to cart" and the entity "apples" and does not require additional information to execute the command, the user intent prediction system 108 can add the apples to the user's cart at 418 and then inform the user that the apples are added to cart via the output 432.

If the user intent prediction system 108 does not detect the intent and entity at step 416, the process 400 moves to slot-filling at step 420. At 420, the user intent prediction system 108 can offer predicted future intents to the user in order to collect the information that it needs to execute the command. The predicted future intents 408 are received from the user intent computing device 102. The user intent computing device 102 can determine proactive and predicted user intents at the step of proactive and predictive intent prediction 406. At this step, the user intent computing device 102 can receive the ASR Output 414 that may include, for example, user intent data (e.g., "add apples to my cart"). The user intent computing device 102 can also receive contextual data 412. The contextual data 412 can include other information regarding the user's interaction with retailer's website or online store. The contextual data can include information regarding previous actions on the website, user data such as address, location, preferences, etc., current status of user's cart, or other settings that the user may have regarding the personal agent. The contextual data can be collected by the user intent prediction system 108 from the user computing devices 112, 120, 122 and or accessed from the database 116. For example, the user intent prediction system 108 can collect and store intent data in the database 116 in intent database 326 and can collect and store contextual data in database 116 in contextual database 328. In other examples, the contextual data 412 can include other information regarding the context or related information for the network-enabled tool, the personal agent, the retailer's website or online store.

The user intent prediction device 102 can apply the ASR Output, user intent data and the contextual data 412 to the user intent engine 310 to determine continuous predicted future intents 408. The predicted future intents 408 are possible future actions that the user can take that the user intent computing device 102 determines are most likely to be taken by the user. These predicted future intents 408 are presented to the user at the slot filling step 420. For example, the user may say "add apples to my cart." In response, the user intent computing device 102 can receive contextual data that user already has a bag of gala apples in his or her cart. Using the contextual data 412 and the ASR Output or intent data 414, the user intent computing device 102 can determine that the most likely action that the user will take is to increase the quantity of the gala apples (i.e., add another bag to the cart) or add a different item (i.e., add a different type of apples to the cart). Thus, the personal agent can present these two options in the slot-filling step 420. For example, the personal agent may say to the user "hmm, I found a bag of gala apples in your cart. You can change the quantity or hear about different items. What would you like to do?"

The slot-filling step 420 continues until the user intent prediction system 108 has enough information to execute the command. At step 422, the user intent prediction system determines if the user has selected a predicted future intent.

If the user has selected a predicted user intent, the process moves to step 418 as previously described and the command is executed and presented to the user (step 430). If the user has not selected a predicted future intent, the process moves back to slot-filling 420 at which other predicted intents may be presented to the user until the command can be executed.

As can be appreciated, the process 400 includes the layer of proactive and predictive intent prediction 406 that is built on the layer of intent classification and named entity recognition 410. This additional process of proactive and predictive intent prediction 406 can increase the satisfaction of the user and reduce the amount of time to execute a command. For example, in a process without user intent prediction system 108 that does not include the proactive and predictive intent prediction 406, the previously described example can lead to unwanted actions that make a user's interaction with the personal agent and/or the retailer's website or online store a frustrating experience.

Without the proactive and predictive intent prediction 406, a user that says "add apples to my cart" may have an experience in which the personal agent adds a bag of apples to his or her cart despite the fact that the user already has a bag of apples in his or her cart. Thus, the user could then move forward with a purchasing step to see that he or she has two bags of apples when he or she only wanted one. The use of contextual data 412 can allow the user intent prediction system 108 to arrive at shopping experiences without this frustration. In addition, the proactive and predictive intent prediction step 406 recognized that this user already has gala apples in his or her cart. This recognition could reduce the amount of steps required by the user to search for all types of apples. Instead, the user could simply add a second bag. As such, the user intent prediction system 108 can increase customer satisfaction.

As can be appreciated, the process 400 is a simplified illustration of the processing that occurs to arrive at the output to user 432. In other examples, the process 400 can include other steps or other sub-processes in addition to, or in other sequences, from the one illustrated. As can also be appreciated, the process 400 or the elements thereof can be repeated multiple times during a single interaction between a user and a personal agent, network-enabled tool, retailer's website or online store.

Figure 5:
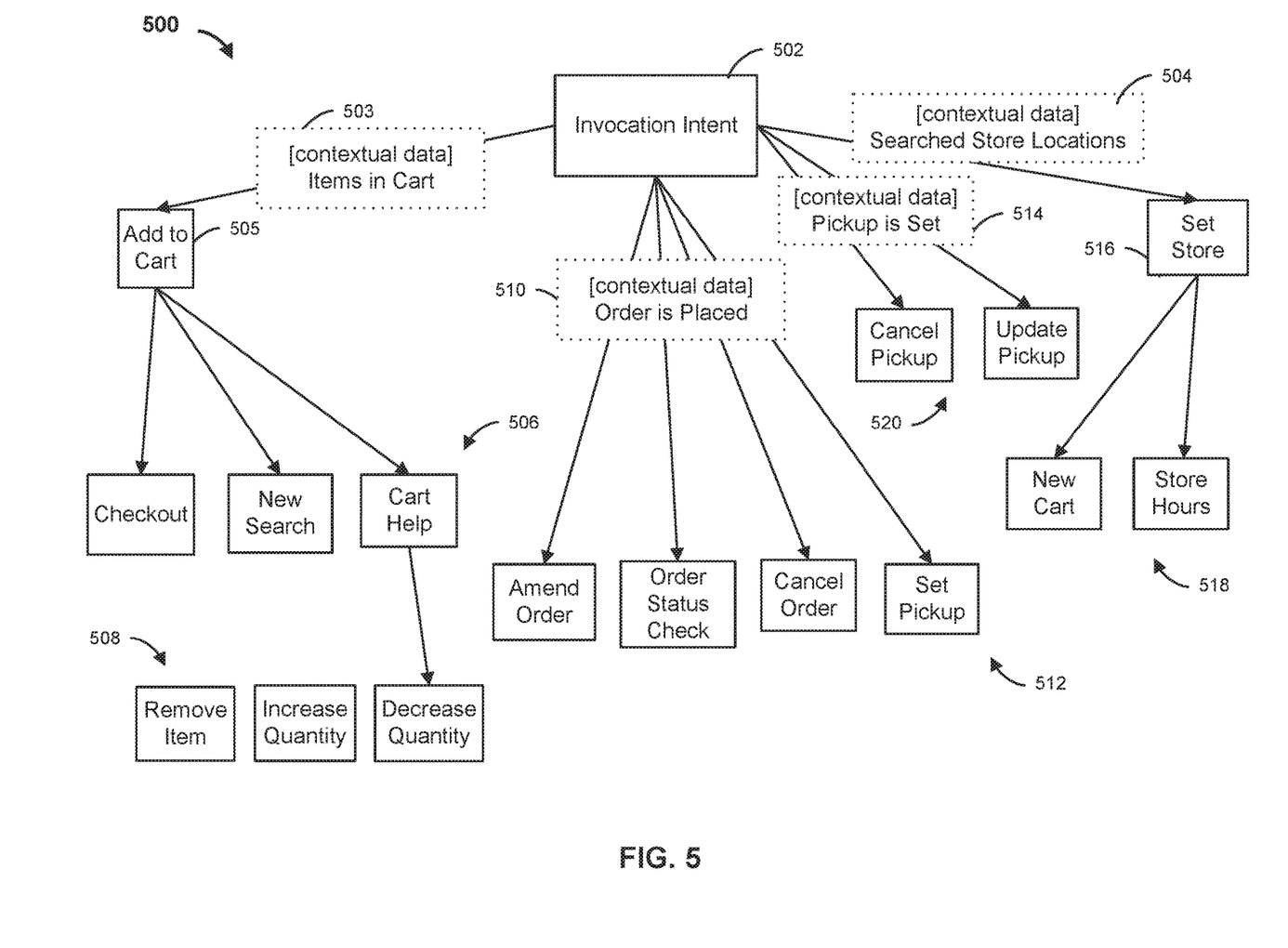
FIG. 5 is an illustration showing an exemplary intent tree that can be implemented using the user intent prediction system of FIG. 3 in accordance with some embodiments.

Referring now to FIG. 5, an example intent tree that illustrates the predicted user intents that may be presented to a user in a circumstance in which the user intent prediction system 108 has received contextual data. As shown, the user may provide user input in the nature of an invocation intent 502. The invocation intent 502 can include any suitable invocation as described above such as pressing a button and/or making a vocal invocation such as "hey Walmart." Upon such user input, the user intent computing device may also receive contextual data. In a first example, the contextual data 503 may indicate that the user has items in his or her virtual cart. The user intent computing device may predict that the user is likely to add to cart as indicated at 505. If the user proceeds to add to cart 505, the user intent computing device 102 may predict that the user is next likely to either checkout, conduct a new search, or require cart help. These options of predicted future intents 506 can be presented to the user. If the user chooses cart help, the user intent computing device 102 can further predict that the user is likely to remove an item from the cart, increase a quantity of an item or decrease a quantity of an item as shown in the listing of predicted future intents 508. In other examples, the user intent computing device 102 can predict other predicted future intents.

In another example, the user intent computing device 102 may receive contextual data 510 that indicates that the user has placed an order. In such example, the user intent computing device 102 may determine that the user is likely to amend the order, desire an order status check, cancel the order, or set a pickup for the order. In this circumstance, the user intent computing device can present to the user these options as predicted future intents 512.

In yet another example, the user intent computing device 102 may receive contextual data 514 that indicates that the user has set a pickup for his or her order. In such example, the user intent computing device 102 may determine that the user is likely to cancel the pickup or update the pickup. In this circumstance, the user intent computing device can present these predicted future intents 520 to the user.

In still another example, the user intent computing device 102 may receive contextual data 504 that indicates that the user previously searched store locations. In such example, the user intent computing device 102 may determine that the user is likely to set a preferred store. This predicted future intent 516 can be presented to the user by the user intent computing device 102. If this predicted future intent 516 is selected by the user, the user intent computing device 102 can further determine that the user is next likely to want a new cart to begin shopping or to want information regarding store hours. These predicted future intents 518 can be presented to the user by the user intent computing device 102. In another example, the user intent computing device 102 can receive user intent and/or contextual data that indicates that a user has queried a frequently asked question (FAQ) asking how to set a pickup slot or any other pickup slot setting FAQ. The user intent computing device 102 can determine that the user would like to set a pickup slot (or other pickup setting). The user intent computing device 102 could then present the pickup slot setting as a predicted future intent to the user.

Figure 6A:
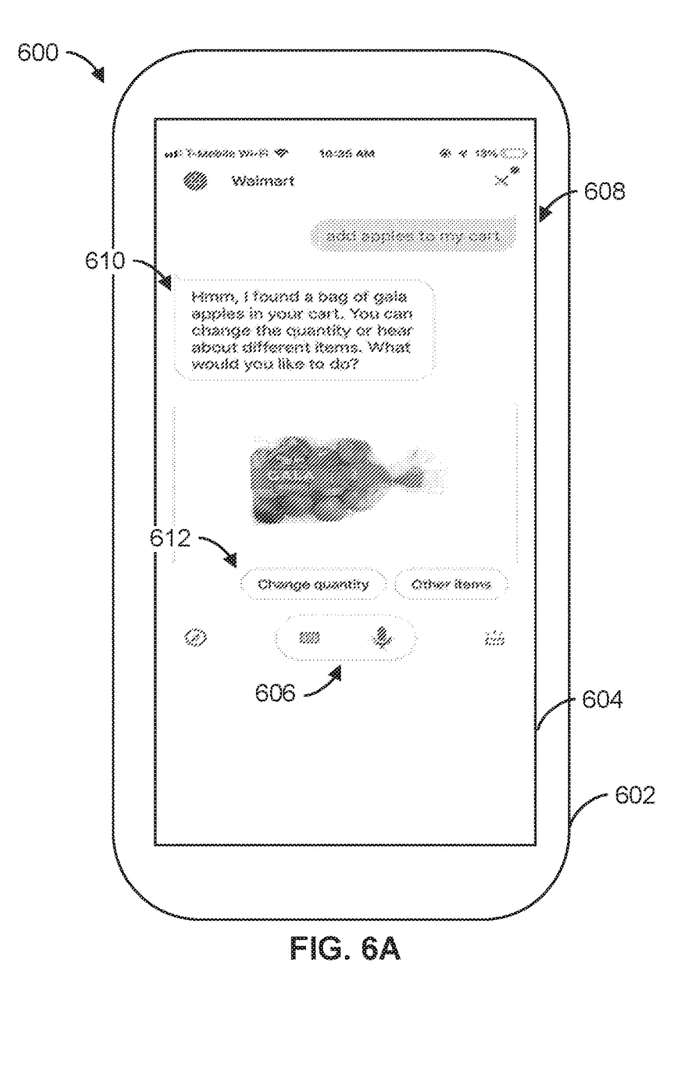
FIGS. 6A and 6B are exemplary graphical user interfaces that can be implemented on a mobile computing device using the user intent prediction system of FIG. 3 in accordance with some embodiments.
Figure 6B:
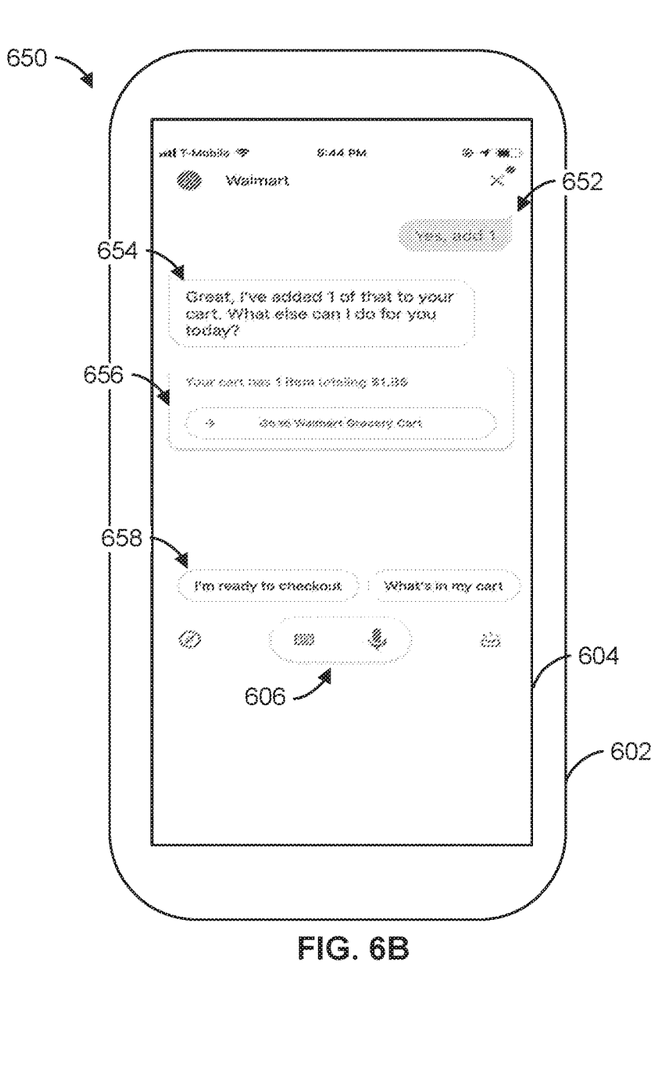

Turning now to FIGS. 6A and 6B, example graphical user interfaces 600, 650 are shown that include example interactions between a user and the user intent prediction system of the present disclosure. In the example shown, the graphical user interfaces 600, 650 can appear on a touchscreen 604 of a mobile user computing device 602. In other examples, the graphical user interfaces 600, 650 can appear on other user devices. As shown in the first example, user input in the nature of a user intent 608 is input through the mobile user computing device 602 to the user intent prediction system. In this example, the user has input the phrase "add apples to my cart." The user may have input this phrase by typing or by using the microphone and speaking the phrase. The user may select the input method using one of the input buttons 606.

In this example, the user intent prediction system received intent data in the nature of the spoken phrase and has received contextual data that indicates that the user already has a bag of gala apples in his or her cart. This contextual data is received and/or collected by the user intent prediction system automatically without interaction or knowledge of the user. The user intent prediction system predicts that the user is likely next to change a quantity of items in his or her cart and/or to want to add or search other items. In response, the user intent prediction system, therefore responds by speaking "hmm, I found a bag of gala apples in your cart. You can change the quantity or hear about different items. What would you like to do?" The user intent prediction system also presents these options to the user in the nature of selectable intents 612. The selectable intents 612 allow the user to simply push the selectable intent to move forward with this action. The user could also use the input buttons 606 to speak the action or type the action.

The graphical user interface 650 of FIG. 6B illustrates another example interaction between a user and the personal agent that includes the user intent prediction system 108 of the present disclosure. In this example, the user has provided user input of an intent and has input, "Yes, add 1." In response, the user intent prediction system has determined that the user is likely next to be ready for checkout or desires to know what is in his or her virtual cart. In this circumstance, the user intent prediction system 108 provides a response to the user that says, "Great, I've added 1 of that to your cart. What else can I do for you today." The user intent prediction system also provides a link button 656 that allows the user to go to his or her virtual cart. The user intent prediction system 108 also provides the predicted future intents 658 that indicate the determined predicted future intents of "I'm ready for checkout" and "What's in my cart?"

As previously described, by providing an interface, such as graphical user interfaces 600, 650, that present the predicted user intents 612, 658 to the user, the amount of time that a user spends with the personal agent or on the retailer's website or online store can be reduced. Furthermore, these indications can provide a cue for the user to interact with the personal agent to use words, phrases that the personal agent can readily classify and detect as previously described.

Figure 7:
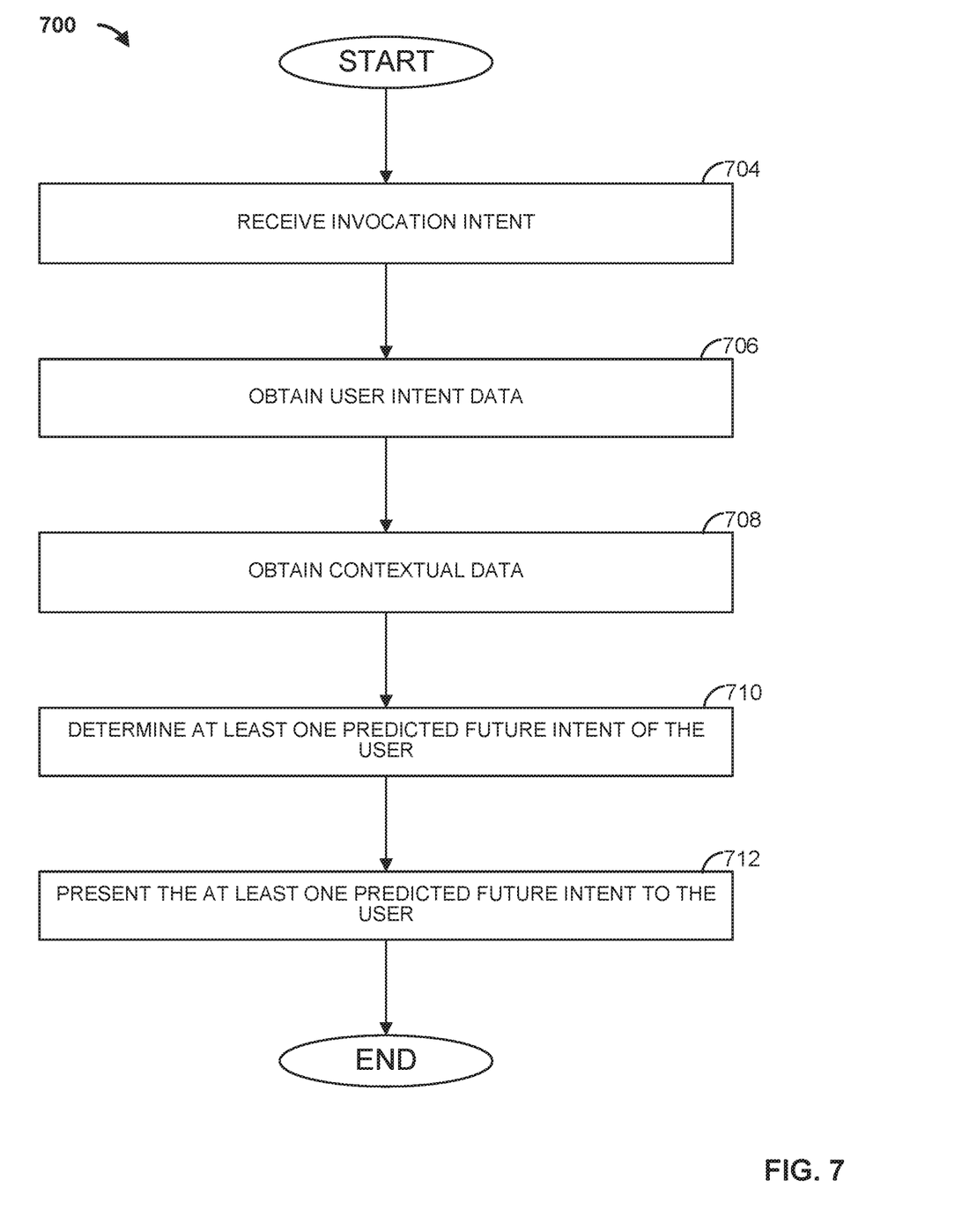
FIG. 7 is a flowchart of an example method that can be carried out by the user intent prediction system of FIG. 1 in accordance with some embodiments.

Referring now to FIG. 7, an example method 700 of proactively predicting user intents on a personal agent or network-enabled tool is illustrated. The method begins at step 704 when the user intent prediction system 108 can receive an invocation intent. The user intent prediction system 108 can receive an invocation intent from via a transceiver from a mobile user computing device 120 or other computing device. The invocation intent can be any suitable signal or other input that signals or communicates to the user intent prediction system 108 or personal agent that the user desires to take an action.

The user intent prediction system can then obtain user intent data at step 706. The user intent data is data that indicates that the user desires to take an action. The user intent data may include, for example, user current query data and user conversation data from the user's current session. The user current query data can be a command or question that a user has currently posed to the personal agent. The user conversation data can be a statement, previous query or command or other conversation element. All user queries (or commands) in the conversation between the user and the personal agent (e.g., user intent computing device 102) that have taken place until the present conversation session can also be used as user intent data. The user intent computing device 102, for example, can obtain the user intent data in real time from the natural language processing device 104. In still other examples, the user intent computing device 102 can record and/or store previous actions by the user and use previous actions as user intent data.

At step 708, the user intent prediction system 108 can obtain contextual data. The contextual data is data that indicates a user's interactions with the personal agent, the retailer's website, or online store. Contextual data can also include information regarding previous actions on the website, user data such as address, location, preferences, user sentiment as indicated by the user in the conversation, current status of user's cart, or other settings that the user may have regarding the personal agent or the user intent prediction system 108. The user sentiment, in some examples, is provided to and/or received by the user intent prediction system 108 from a user sentiment deep learning model. The user intent prediction system 108 can obtain contextual data from other computing devices via application protocol interfaces (APIs) with such other computing devices. The user intent prediction system 108 may also obtain the data from data exchanged between the user intent prediction system 108 and the mobile computing device 120, for example. In other examples, the contextual data can be obtained from the contextual database 328 of the database 116.

At step 710, the user intent prediction system 108 can determine at least one predicted future intent of the user. The at least one predicted future intent can be based on the intent data and the contextual data. The user intent prediction system 108 can determine multiple predicted future intents. The predicted future intents can be actions that the user intent computing device 102 determines are likely future actions to be taken by the user. In one example, the user intent computing device 102 applies the user intent data and the contextual data to the user intent engine 310 that may be a trained predictive user intent data model to determine the predicted future intents.

At step 712, the user intent prediction system can present the at least one predicted future intent to the user. The predicted future intents can be presented to the user using any suitable method. For example, the predicted future intents can be spoken to the user as audible options to the user. In another example, the predicted future intents can be displayed to the user as a selectable button, hyperlink, or other visual cue. The predicted future intents can be presented in a predetermined or ranked order. The predicted future intents can be presented, for example, in an order that is ranked according to various business or commercial goals. In such examples, the user intent prediction system 108 can include business logic that ranks the predicted future intents according to the rules and/or algorithms in the business logic.

As shown, the method 700 ends following step 712. As can be appreciated, however, this method can be repeated for each action that a user desires to take using the personal agent. In the example use on a retailer's website or on an online store, this process can be repeated for each step of the purchasing process including searching, displaying, adding item to cart, purchasing items, selecting delivery or pick-up details. In addition, follow-up processes including customer service, returns, order changes and the like can also be facilitated and improved using the methods of the present disclosure.

Figure 8:
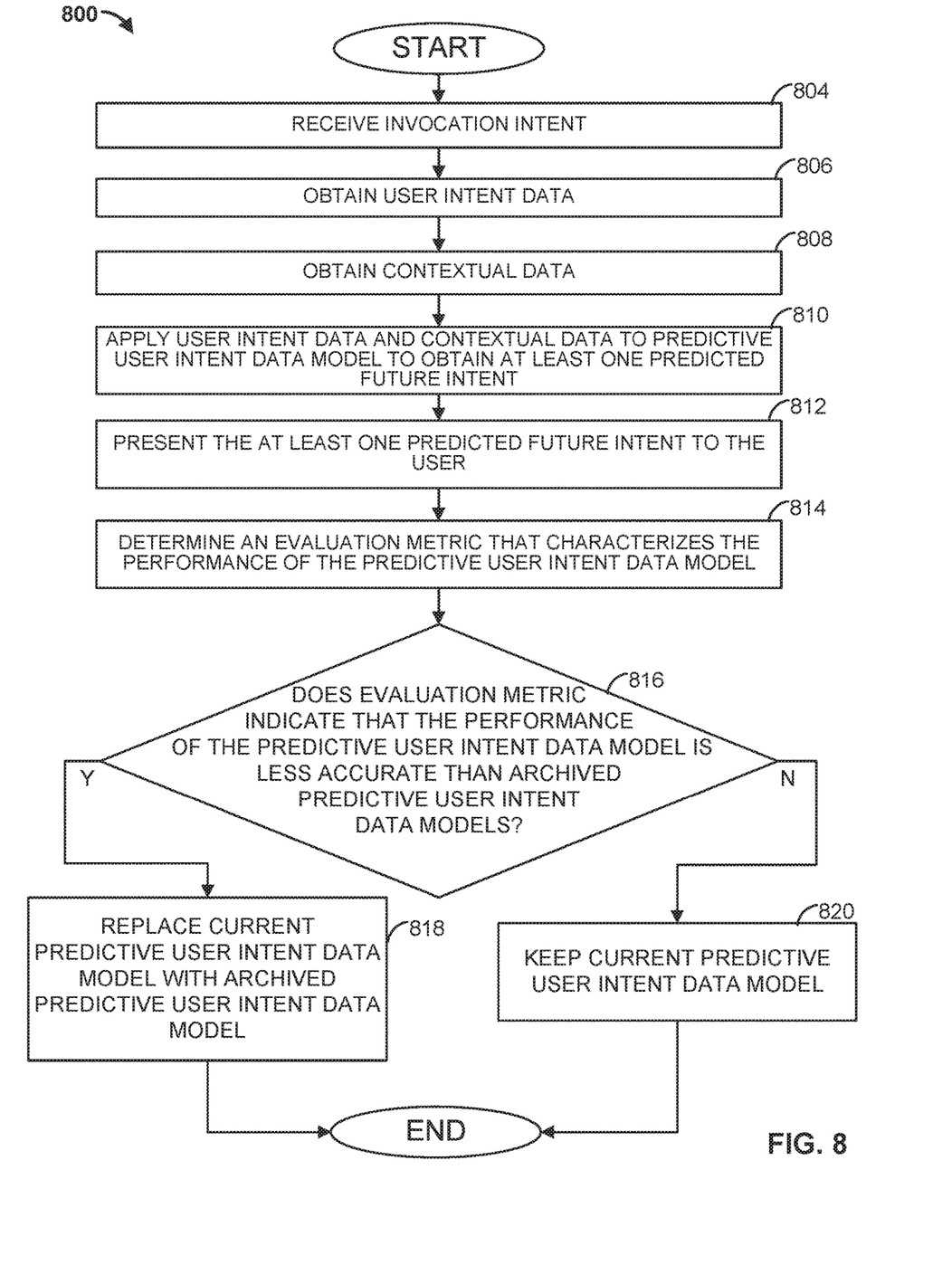
FIG. 8 is a flowchart of another example method that can be carried out by the user intent prediction system of FIG. 1 in accordance with some embodiments.

FIG. 8 illustrates another example method of the present disclosure. Example method 800 illustrates another method of proactively predicting a user intent using a personal agent or other network-enabled tool. Steps 804, 806, and 808 are similar to steps 704, 706, 708 previously described and are not repeated here for the sake of brevity. At step 810, the user intent prediction system 108 can apply the user intent data and the contextual data to a predictive user intent data model to obtain at least one predicted future intent. This step is similar to step 710 previously described. The user intent data model is an example implementation of the user intent engine 310 previously described.

At step 812, the user intent prediction system 108 can present the at least one predicted future intent to the user. Step 812 is similar to step 712 previously described. The predicted future intent can be presented to the user using any suitable method including an audible message, selectable button, hyperlink, or other visual cue.

At step 814, the user intent prediction system 108 can determine an evaluation metric that characterizes the performance of the predictive user intent data model. Any suitable evaluation metric can be used to characterize the performance of the predictive user intent data model. In some examples, a receiver operating characteristic (ROC) curve or ROC-accuracy can be used as the evaluation metric. In other examples, Hamming loss and exact accuracy can be used as the evaluation metric to characterize the performance of the predictive user intent data model. In still other examples, a Hit-ratio can be used as the evaluation metric to characterize the performance of the predictive user intent data model.

The Hit-ratio can be computed using the following formula:

$$\text{Hit-ratio} = \frac{\text{cardinality of the set of users having at least one accurate intent prediction}}{\text{number of all users}}$$

The Hit-ratio can measure the cover of users who will have at least one pleasant experience with the user intent prediction system. The Hit-ratio can also be characterized and calculated using the formula:

$$\text{Hit-ratio} = |\{u | s \; u\text{'s} \; u \; p > 0\}|/M_i$$

where the numerator is the cardinality of the set of users having at least one accurate intent prediction (e.g., where user clicked on a predicted future intent at least once) and the denominator is the number of all users on day i.

The evaluation metric, such as the Hit-ratio or other evaluation metrics described above, can indicate whether the predictive user intent data model is operating to improve the user's experience on the personal agent, the retailer's website or online store. In some examples, the user intent prediction system can determine multiple evaluation metrics to determine the performance of the predictive user intent data model.

Still other example evaluation metrics can be used to indicate an improvement in the performance of the predictive user intent data model. One example evaluation metric can include an increase in user's usage of predicted intents that are presented to the users. Another evaluation metric can be an increase in a conversation length between the user and the personal agent so long as the user sentiment during the conversation is positive sentiment. Another evaluation metric can be a decrease in a conversation length between the user and the personal agent when the sentiment during the conversation is negative sentiment. In yet another example evaluation metric, a click rate can be used. In such an example the click rate can be calculated using the formula:

$$\text{Click Ratio} = \frac{\text{\# of predicted future intents clicked (i.e., selected) by a user}}{\text{Total \# of predicted future intents presented to users}}$$

The Click Ratio can be measured for any suitable time period such as an hour, day, week, month or other time period.

At step 816, the user intent prediction system 108 can determine whether the evaluation metric indicates that the performance of the predictive user intent data model is less accurate than archived predictive user intent data models. The user intent prediction system 108 can perform this task by comparing one or more of the determined evaluation metrics with archived determined evaluation metrics of archived predictive user intent data models.

While not shown in FIG. 8, the user intent prediction system 108 can continuously update the predictive user intent data model as the data model continuously learns due to the increased data that is available to the data model once the data model is actively used on a retailer's website or online store. The user intent prediction system 108 can collect user intent data and/or contextual data as users interact with the system and store such data in the user intent database 326 and the contextual database 328, respectively. The predictive user intent data model can continuously learn and update itself as this data is used and incorporated into the data model.

The user intent prediction system 108 can also store archived versions of the predictive user intent data model to preserve previous versions. The user intent prediction system 108 can, for example, save a version of the predictive user intent data model on a periodic basis at predetermined intervals (e.g., hourly, daily, weekly, etc.). The user intent prediction system 108 can, in other examples, save versions of the predictive user intent data model based on an improvement of the predictive user intent data model as determined by one or more of the evaluation metrics. For example, upon achieving a 5%, 10%, or 20% improvement in a predetermined evaluation metric, the user intent prediction system 108 can save an archived version of the predictive user intent data model. In this manner, archived versions of the predictive user intent data model are saved in the data model archive 330 of the database 116 (FIG. 3).

If the user intent prediction system 108 determines that the determined evaluation metric indicates that the predictive user intent data model is less accurate than an archived predictive user intent data model, the user intent prediction system 108 can restore or replace the current predictive user intent data model with the archived predictive user intent data model. In this manner, the most accurate predictive user intent data model is active in the user intent prediction system 108.

If the user intent prediction system 108 determines that the determined evaluation metric indicates that the predictive user intent data model has the same accuracy or a greater accuracy than archived predictive user intent data models, then the user intent prediction system 108 can keep the current predictive user intent data model. Thus, accuracy of the model is maintained at a level that provides the most benefit to the user.

As previously stated, the user intent prediction system 108 is described herein in the context of a retailer website or online store. The user intent prediction system 108, however, can be applied in multiple other contexts of personal agents. In one example, the user intent prediction system 108 is applied in the context of an automated customer service agent that provides customer service over the telephone. In such a circumstance, the communication is accomplished with voice commands and touch-tone signals. In other examples, the user intent prediction system can be used on smart speakers, smart screens, tablets, servers, point of purchase kiosks, operating systems, customer service systems, voicemail systems, email systems, digital messaging systems and other computing devices Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
a computing device configured to:
   obtain user intent data identifying a desired action based on a first input by a user on a network-enabled tool;
   obtain contextual data characterizing a user's interaction with the network-enabled tool;
   determine at least one predicted future intent of the user on the network-enabled tool based on the user intent data and the contextual data using a predictive user intent model, wherein the at least one predicted future intent identifies at least one suggested action that is suggested to be performed by the user after the desired action;
   cause the network-enabled tool to automatically complete the desired action and automatically present the at least one suggested action to the user on the network-enabled tool, before the user provides any additional input after the first input; and
   update the predictive user intent model using updated data including the user intent data and the contextual data obtained by the system to replace synthetic data, wherein the system comprises a user intent prediction system that can continuously update the predictive user intent model, wherein the user intent data and the contextual data is collected during use of the system.

2. The system of claim 1, wherein the network-enabled tool is an electronic personal agent or voice assistant.

3. The system of claim 1, wherein the user intent data comprises user current query data and user conversation data from a current session with the network-enabled tool and the contextual data comprises user preferences or current status of the current session.

4. The system of claim 1, wherein the user intent data and the contextual data are obtained in real-time during a common session by the user on the network-enabled tool.

5. The system of claim 1, wherein the automatically presenting the at least one suggested action to the user comprises causing the network-enabled tool to display or audibly communicate the at least one suggested action as a selectable action of a plurality of selectable actions.

6. The system of claim 1, wherein the determining the at least one predicted future intent comprises applying the user intent data and the contextual data to the predictive user intent model trained with the synthetic data.

7. The system of claim 6, wherein the computing device is further configured to:
   determine an evaluation metric that characterizes a performance of the predictive user intent model;
   compare the determined evaluation metric to an archived evaluation metric of an archived predictive user intent model; and
   replace the predictive user intent model with the archived predictive user intent model when the evaluation metric indicates that the predictive user intent model is less accurate than the archived predictive user intent model.

8. A method comprising:
   obtaining user intent data identifying a desired action based on a first input by a user on a network-enabled tool;
   obtaining contextual data characterizing a user's interaction with the network-enabled tool;
   determining at least one predicted future intent of the user on the network-enabled tool based on the user intent data and the contextual data using a predictive user intent model, wherein the at least one predicted future intent identifies at least one suggested action that is suggested to be performed by the user after the desired action;
   automatically completing the desired action and automatically presenting the at least one suggested action to the user on the network-enabled tool, before the user provides any additional input after the first input; and
   updating the predictive user intent model using updated data including the user intent data and the contextual data obtained by the system to replace synthetic data, wherein the predictive user intent model can be continuously updated, and wherein the user intent data and the contextual data is collected during use of the system.

9. The method of claim 8, wherein the network-enabled tool is an electronic personal agent or voice assistant.

10. The method of claim 8, wherein the user intent data comprises user current query data and user conversation data from a current session with the network-enabled tool and the contextual data comprises user preferences or current status of the current session.

11. The method of claim 8, wherein the user intent data and the contextual data are obtained in real-time during a common session by the user on the network-enabled tool.

12. The method of claim 8, wherein the presenting the automatically at least one suggested action to the user comprises causing the network-enabled tool to display or audibly communicate the at least one suggested action as a selectable action of a plurality of selectable actions.

13. The method of claim 8, wherein the determining the at least one predicted future intent comprises applying the user intent data and the contextual data to the predictive user intent model trained with the synthetic data.

14. The method of claim 13, further comprising:

determining an evaluation metric that characterizes a performance of the predictive user intent data model;

comparing the determined evaluation metric to an archived evaluation metric of an archived predictive user intent model; and replacing the predictive user intent model with the archived predictive user intent model when the evaluation metric indicates that the predictive user intent model is less accurate than the archived predictive user intent model.

15. A non-transitory computer readable medium having instructions stored thereon, wherein the instructions, when executed by at least one processor, cause a device to perform operations comprising:

obtaining user intent data identifying a desired action based on a first input by a user on a network-enabled tool;

obtaining contextual data characterizing a user's interaction with the network-enabled tool;

determining at least one predicted future intent of the user on the network-enabled tool based on the user intent data and the contextual data using a predictive user intent model, wherein the at least one predicted future intent identifies at least one suggested action that is suggested to be performed by the user after the desired action;

automatically completing the desired action and automatically presenting the at least one suggested action to the user on the network-enabled tool, before the user provides any additional input after the first input; and updating the predictive user intent model using updated data including the user intent data and the contextual data obtained by the system to replace synthetic data, wherein the predictive user intent model can be continuously updated, and wherein the user intent data and the contextual data is collected during use of the system.

16. The non-transitory computer readable medium of claim 15, wherein the network-enabled tool is an electronic personal agent or voice assistant.

17. The non-transitory computer readable medium of claim 15, wherein the user intent data comprises user current query data and user conversation data from a current session with the network-enabled tool and the contextual data comprises user preferences or current status of the current session.

18. The non-transitory computer readable medium of claim 15, wherein the automatically presenting the at least one suggested action to the user comprises causing the network-enabled tool to display or audibly communicate the at least one suggested action as a selectable action of a plurality of selectable actions.

19. The non-transitory computer readable medium of claim 15, wherein the predictive user intent model is trained with the synthetic data.

20. The non-transitory computer readable medium of claim 19, having instructions stored thereon, wherein the instructions, when executed by the at least one processor, cause the device to perform further operations comprising:

determining an evaluation metric that characterizes a performance of the predictive user intent model;

comparing the determined evaluation metric to an archived evaluation metric of an archived predictive user intent model; and replacing the predictive user intent model with the archived predictive user intent model when the evaluation metric indicates that the predictive user intent model is less accurate than the archived predictive user intent model.

* * * * *